US009042592B2

(12) United States Patent
Chen et al.

(10) Patent No.: US 9,042,592 B2
(45) Date of Patent: May 26, 2015

(54) ELECTRONIC DEVICE WITH SPEAKERS

(71) Applicant: Chi Mei Communication Systems, Inc., New Taipei (TW)

(72) Inventors: Wei-Rung Chen, New Taipei (TW); Kuang-Hsien Wang, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 85 days.

(21) Appl. No.: 13/948,776

(22) Filed: Jul. 23, 2013

(65) Prior Publication Data

US 2014/0153769 A1 Jun. 5, 2014

(30) Foreign Application Priority Data

Nov. 30, 2012 (TW) ................................ 101145193

(51) Int. Cl.

*H04R 1/02* (2006.01)
*H04R 1/28* (2006.01)
*H04M 1/00* (2006.01)

(52) U.S. Cl.

CPC .............. *H04R 1/28* (2013.01); *H04R 2499/11* (2013.01)

(58) Field of Classification Search

CPC .. H04R 1/02; H04R 2499/11; H04R 2499/15; H04R 1/403; H04R 3/00; H04R 1/40; H04M 1/03; H04M 1/026; H04M 1/0277; H04M 1/0202; H04M 1/035; H04M 1/04

USPC ......... 381/394, 351, 306, 388, 333, 334, 335; 379/430, 433.01, 433.02; 455/569.1, 455/550.1, 575.8, 575.1, 90.3

See application file for complete search history.

(56) References Cited

U.S. PATENT DOCUMENTS

2005/0181841 A1* 8/2005 Dou ........................... 455/575.1
2006/0083401 A1* 4/2006 Go ................................ 381/396

* cited by examiner

*Primary Examiner* — Curtis Kuntz
*Assistant Examiner* — Sunita Joshi
(74) *Attorney, Agent, or Firm* — Novak Druce Connolly Bove + Quigg LLP

(57) ABSTRACT

An electronic device includes a first housing, a second housing engaged with the first housing, a circuit board enclosed between the first and second housings, two speakers, and an antenna. The speakers and the antenna are attached to two sides of the circuit board. The first housing defines two receiving recesses in a surface facing the circuit board and two first through holes each adjacent to one corresponding receiving recess. Each receiving recess defines a second through hole in a bottom. The speakers are received in the receiving recesses. The receiving recesses communicate with the vents to form front resonating chambers for the speakers. The circuit board defines two third through holes aligned with the first through holes and communicating with the recessed sections. The first, second, and third through holes, the recessed sections, and the vents communicate with each other to form back resonating chambers for the speakers.

5 Claims, 4 Drawing Sheets

ELECTRONIC DEVICE WITH SPEAKERS

BACKGROUND

1. Technical Field

The present disclosure relates to an electronic device equipped with speakers.

2. Description of Related Art

Portable electronic devices, such as mobile phones and tablet computers, usually have speakers. Portable electronic devices equipped with speakers define cavities for receiving the speakers. The cavities are usually large to allow resonance of sounds emitted by the speakers. However, such large cavities require a lot of space, making it difficult to miniaturize the portable communication devices. In addition, portable electronic devices equipped with speakers further define holes above the speakers for sound propagation. However, such arrangements of holes can increase the thickness of the portable electronic devices.

Therefore, there is room for improvement within the art.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

Figure 1:
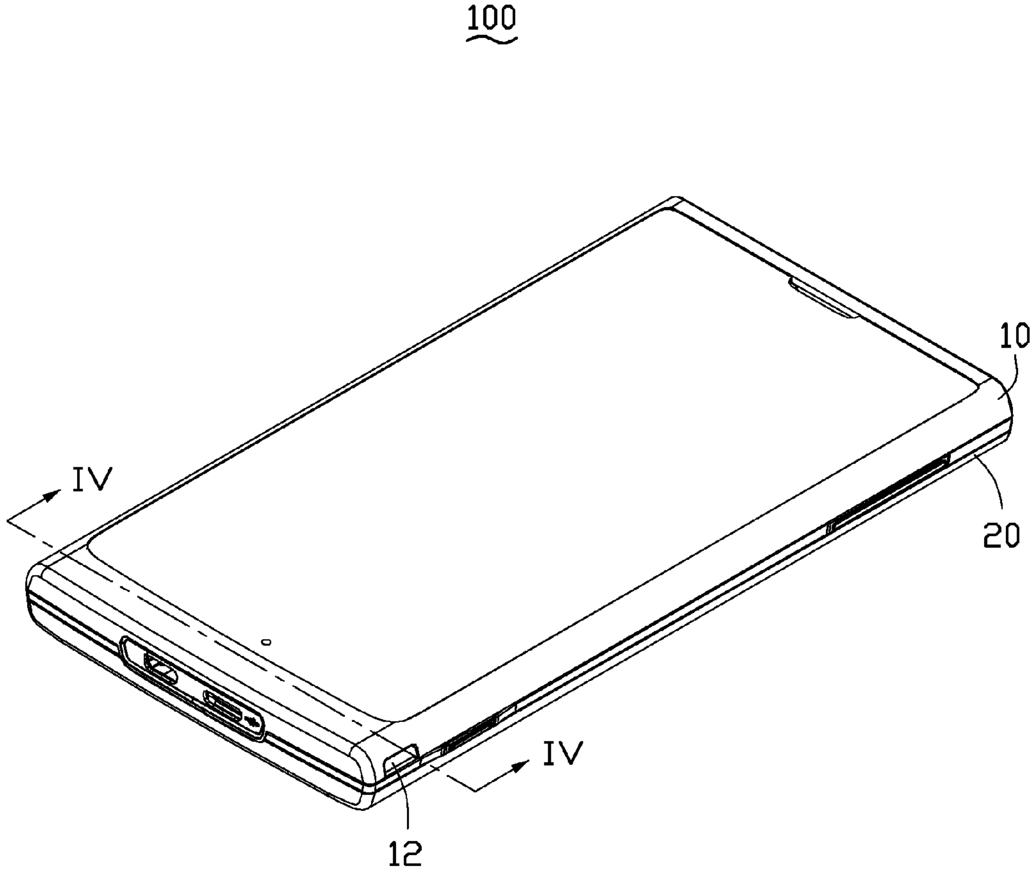
FIG. 1 is an isometric view of an electronic device in accordance with an exemplary embodiment.
Figure 2:
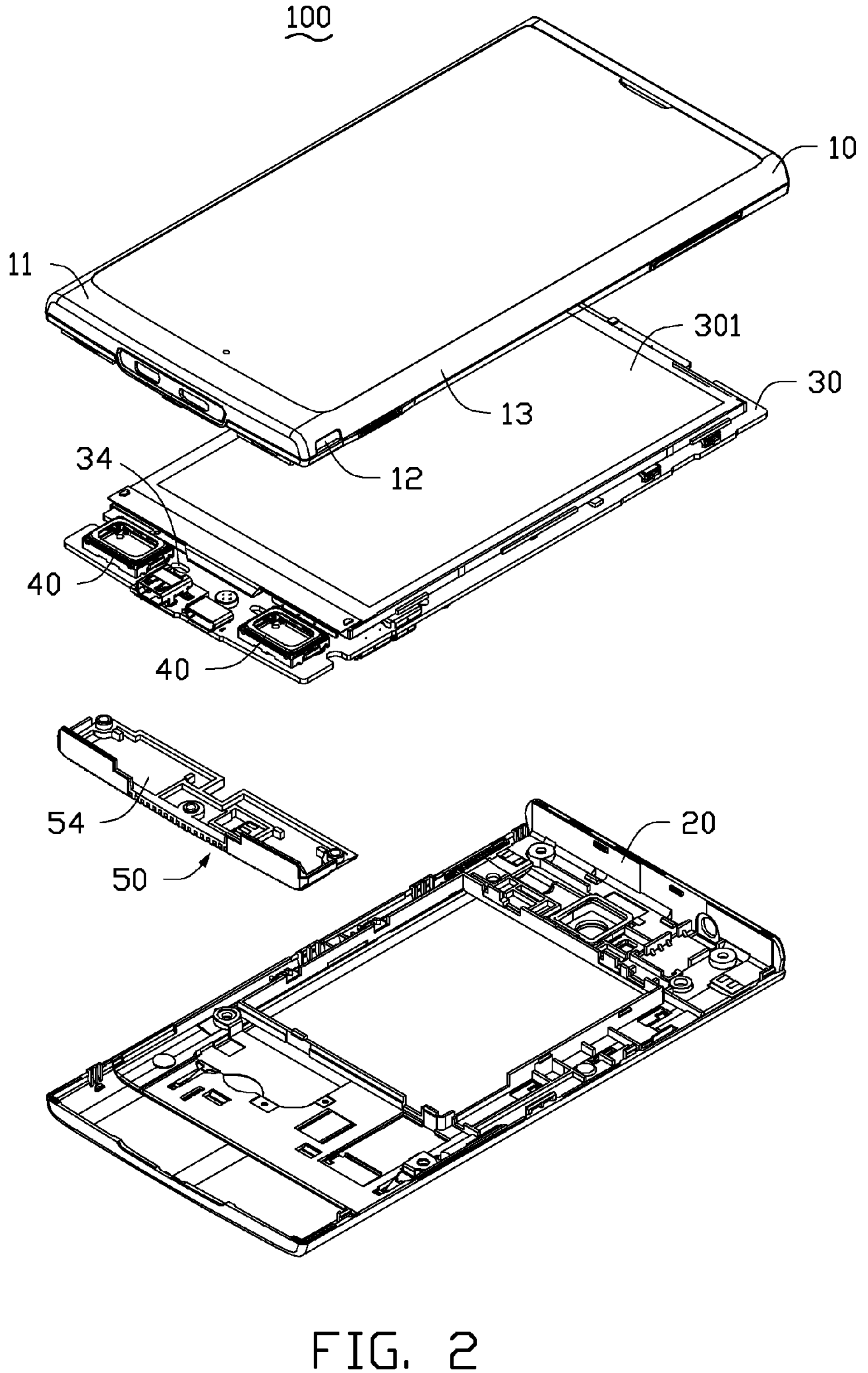
FIG. 2 is an exploded view of the electronic device of FIG. 1 viewed from a first angle.
Figure 3:
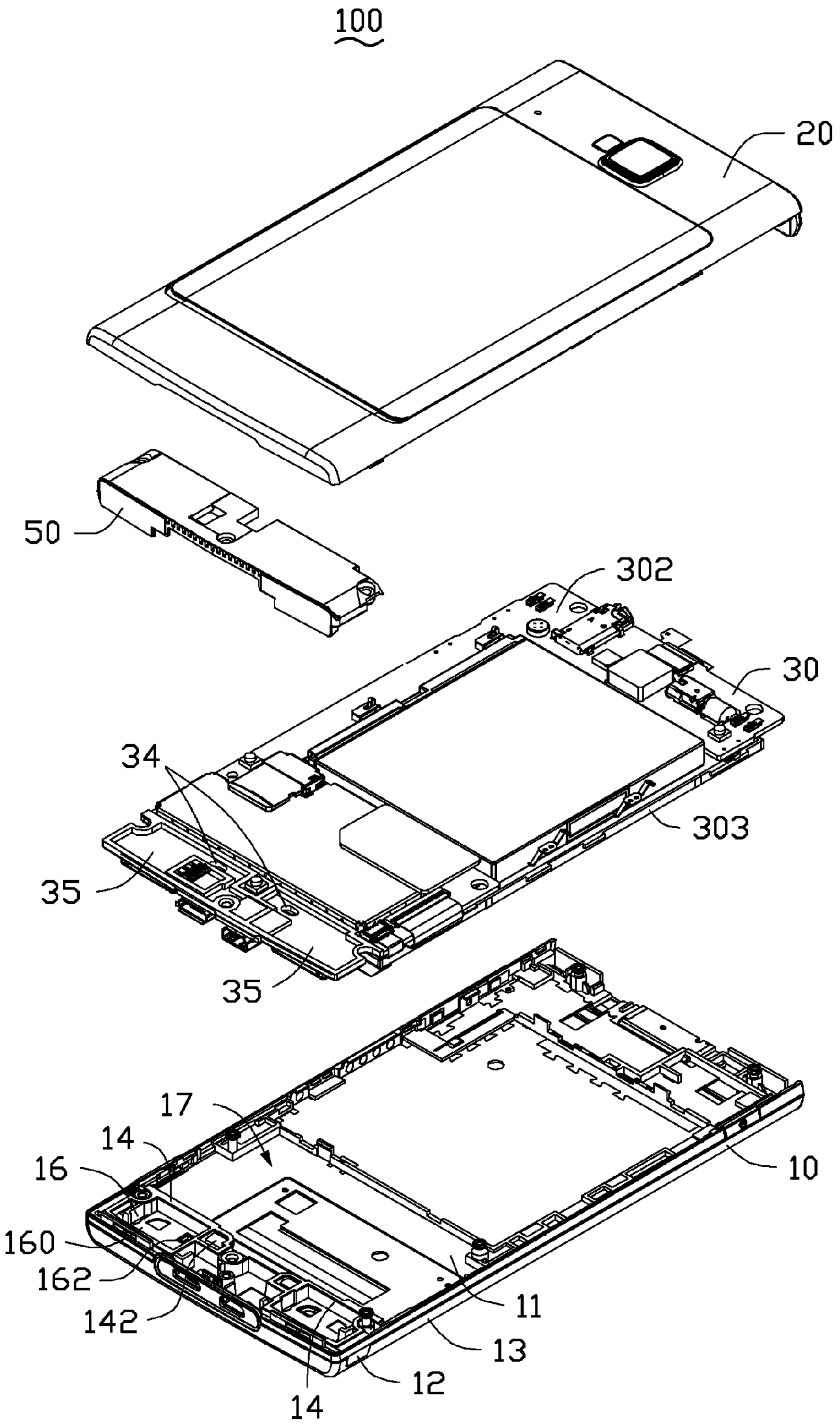
FIG. 3 is an exploded view of the electronic device of FIG. 2 viewed from a second angle.

FIGS. 1 and 2 show an exemplary embodiment of an electronic device 100. In the exemplary embodiment, the electronic device 100 is a mobile phone and includes a first housing 10, a second housing 20, a circuit board 30, two speakers 40, and an antenna 50. The circuit board 30, the two speakers 40 and the antenna 50 are enclosed between the first housing 10 and the second housing 20. The two speakers 40 and the antenna 50 are attached to two opposite surfaces of the circuit board 30, respectively.

Figure 4:
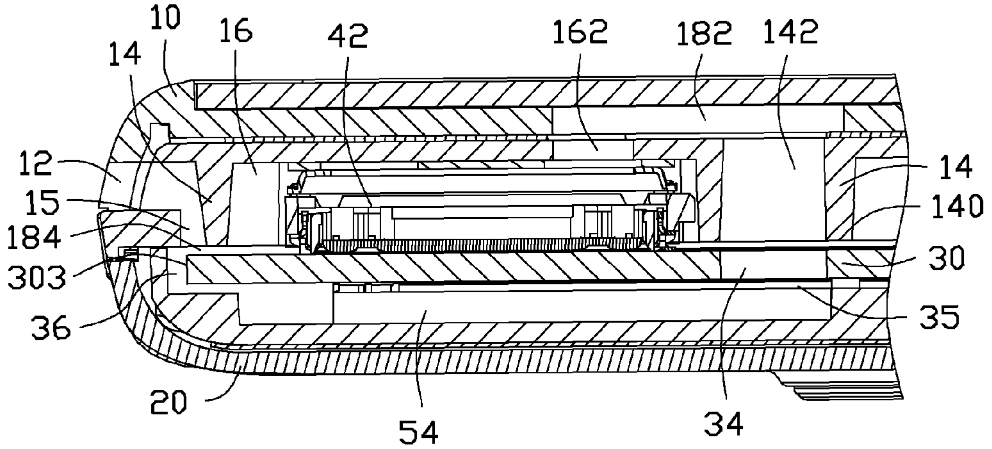
FIG. 4 is a cross sectional view of the electronic device of FIG. 1 taken along line IV-IV.

The first housing 10 may be a front cover of the mobile phone and includes a bottom wall 11 and a peripheral wall 13 surrounding and extending downwardly from the bottom wall 11. The bottom wall 11 and the peripheral wall 13 cooperatively surround an accommodating space 15 (see FIG. 4). The peripheral wall 13 defines two vents 12 in two opposite portions. The vents 12 communicate with the accommodating space 15 and ambient environment. The two vents 12 are configured for allowing sounds emitted by the speakers 40 to exit the electronic device 100. The first housing 10 further includes two receiving recesses 16 and defines two first through holes 142. The two receiving recesses 16 are spaced from each other. The two first through holes 142 are positioned between the two receiving recesses 16. Each first through hole 142 is adjacent to a corresponding receiving recess 16. The two receiving recesses 16 and the two first through holes 142 are surrounded by ribs 14 and the bottom wall 11. The ribs 14 protrude from an inner surface 17 of the bottom wall 11. To facilitate describing the exemplary embodiment, the portions of the inner surface 17 disposed in the receiving recesses 16 are designated as bottoms 160. Each receiving recess 16 has a second through holes 162 defined in the bottom 160. The bottom wall 12 defines two first channels 182 (see FIG. 4) transversely extending in the bottom wall 12. Each of the first channels 182 communicates with the one of the first through holes 142 and one of the second through holes 162.

The second housing 20 may be a rear cover of the mobile phone. The second housing 20 is engaged with the first housing 10 to cooperatively define a receiving space for accommodating the circuit board 30, the two speakers 40, the antenna 50, and other elements of the electronic device 100.

The circuit board 30 is positioned between the first and second housings 10, 20. The circuit board 30 has a first surface 301 facing the first housing 10 and an opposite second surface 302 facing the second housing 20. The circuit board 30 defines two third through holes 34 spaced from each other. Each of the two third through holes 34 is aligned with one of the first through holes 142. The circuit board 30 has two recessed portions 35 in the second surface 302. The two third through holes 34 are located in the two recessed portions 35 and communicate the two recessed portions 35, respectively. In other embodiments, the recessed portions 35 may be omitted.

The two speakers 40 are separately attached to the first surface 301 of the circuit board 30. Each speaker 40 is located at a position corresponding to one of the receiving recesses 16. The two speakers 40 send out sounds and each has a front side facing the circuit board 30 and a back side opposite to the front side.

The antenna 50 has two recessed sections 54. Each recessed section 54 has a shape and size substantially the same as the shape and size of the recessed portions 35 of the circuit board 30. So that, when the antenna 50 is assembled to the circuit board 30, the two recessed sections 54 can fittingly align with and connect to the two recessed portions 35, respectively. The antenna 50 is attached to the second surface 302 of the circuit board 30.

FIGS. 1-4 show that in assembly, the two speakers 40 are mounted to the first surface 301 of the circuit board 30, corresponding to the recessed portions 35, respectively. The antenna 50 is assembled to the second surface 302 of the circuit board 30. The circuit board 30 is positioned between the first and second housings 10, 20. In this case, the two speakers 40 are received in the two receiving recesses 16, respectively. See FIG. 4, top ends 140 of the two ribs 14 of the first housing 10 are spaced from the circuit board 30 a certain distance, thereby forming two second channels 184 between the top ends 140 of the ribs 14 and the circuit board 30. Each second channel 184 communicates with a receiving recess 16 and a vent 12. As such, each receiving recess 16 and one corresponding second channel 184 cooperatively form a front resonating chamber of the corresponding speaker 40. Sounds emitted from a front side of the speakers 40 resonate in the front resonating chambers and exit the electronic device 100 via paths passing through the receiving recesses 16, the second channels 184, and the vents 12, in turn.

Two opposite sidewalls 303 of the circuit board 30 are spaced from the second housing 20 a certain distance, thereby forming two third channels 36 between the sidewalls 303 of the circuit board 30 and the second housing 20. The antenna 50 is positioned between the circuit board 30 and the second housing 20 with the two recessed sections 54 aligning with the two recessed portions 35 of the circuit board 30, enabling the third through holes 34 to be aligned and communicate with the recessed sections 54. As such, the third through holes 34 communicate with the third channels 36 through the recessed sections 54, and the recessed sections 54 communicate with the vents 12 through the third channels 36. Each second through hole 162, the corresponding first channel 182, the corresponding first through hole 142, the corresponding third through hole 34, the corresponding recessed section 54, and the corresponding third channel 36 cooperatively form a back resonating chamber of the corresponding speaker 40. Sounds emitted from a back side of the speakers 40 resonate in the corresponding back resonating chambers and exit the electronic device 100 via paths passing through the second through holes 162, the first channels 182, the first through holes 142, the third through holes 34, the recessed sections 54, the third channels 36, and the vents 12, in turn.

In other embodiments, the first channels 182 can be omitted. Correspondingly, the second holes 162 can communicate with the first holes 142 by forming holes in the ribs 14.

The electronic device 100 utilizes space among the first housing 10, the second housing 20, the circuit board 30, and the antenna 50, forming the front and back resonating chambers for the speakers 40. Sounds emitted by the speakers 40 resonate in the front and back resonating chambers and then exit the electronic device 100 through the vents 12 located at two sides of the first housing 10. As such, a large space for sounds to resonate or vents is not defined above the speakers 40, aiding in the miniaturization of the electronic devices.

It is to be understood, however, that even through numerous characteristics and advantages of the present disclosure have been set forth in the foregoing description, together with details of assembly and function, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. An electronic device with speakers, comprising:

a first housing, the first housing comprising a bottom wall and a peripheral wall surrounding and extending downwardly from the bottom wall; the first housing defining two opposite vents in the peripheral wall;

a second housing assembled to the first housing;

a circuit board positioned between the first and second housings, the circuit board comprising a first surface facing the first housing and a second surface facing the second housing;

two speakers attached to the first surface of the circuit board; and an antenna attached to the second surface of the circuit board, the antenna comprising two recessed sections;

wherein the first housing defines two receiving recesses in a surface facing the circuit board and two first through holes each adjacent to one corresponding receiving recess; each receiving recess defines a second through hole in a bottom thereof; the two speakers are received in corresponding receiving recesses; each receiving recess communicates with one corresponding vent to form a front resonating chamber for the corresponding speaker; the circuit board defines two third through holes aligned with the two first through holes and communicating with the two recessed sections; the bottom wall defines two first channels transversely extending therein; each of the first channels communicates with one corresponding first through hole and one corresponding second through hole; the first through holes, the second through holes, the third through holes, the recessed sections, and the vents communicate with each other and cooperatively form two back resonating chambers for the two speakers, respectively.

2. The electronic device as claimed in claim 1, wherein the bottom wall comprises ribs protruding from an inner surface thereof; the two receiving recesses and the two first through holes are surrounded by the ribs and the bottom wall.

3. The electronic device as claimed in claim 2, wherein two sides of the circuit board are spaced from the second housing, thereby forming two third channels between the two sides of the circuit board and the second housing; each of the two third channels communicates one corresponding recessed section and one corresponding vent hole.

4. The electronic device as claimed in claim 2, wherein top ends of the ribs are spaced from the circuit board, thereby forming two second channels; each of the second channels communicates with one corresponding receiving recess and one corresponding vent hole.

5. The electronic device as claimed in claim 1, wherein the circuit board defines two recessed portions in the first surface; the two third through holes are located in the two recessed portions and communicate with the two recessed portions; the two recessed portions aligned with the two recessed sections, enabling the third through holes to communicate with the recessed sections.

* * * * *